Jan. 9, 1934.   E. G. STRECKFUSS   1,942,520
MEAT SLICER
Filed Sept. 13, 1929   3 Sheets-Sheet 1
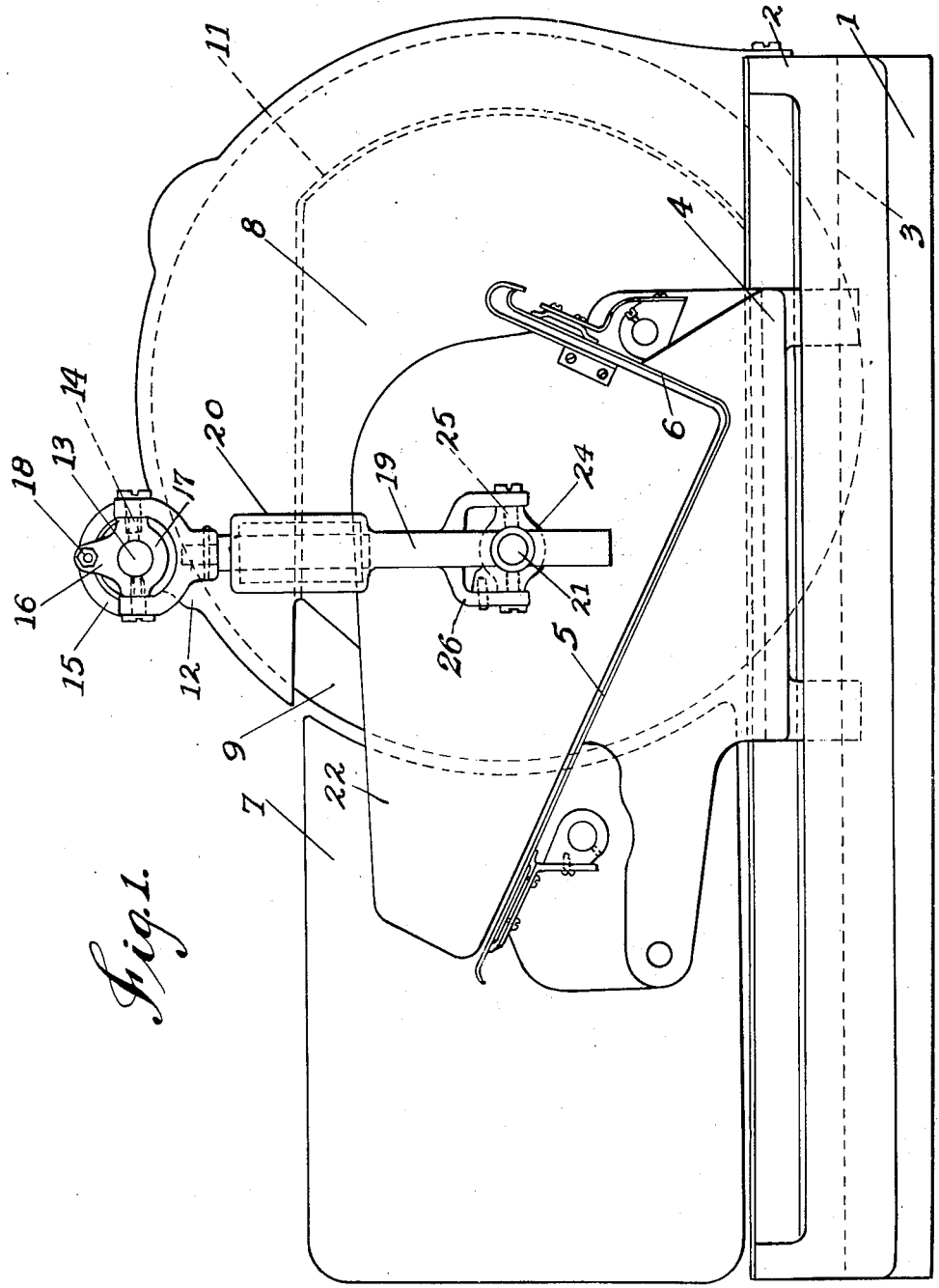
INVENTOR.
Elmer G. Streckfuss
BY
ATTORNEY.

Jan. 9, 1934.    E. G. STRECKFUSS    1,942,520
MEAT SLICER
Filed Sept. 13, 1929    3 Sheets-Sheet 2
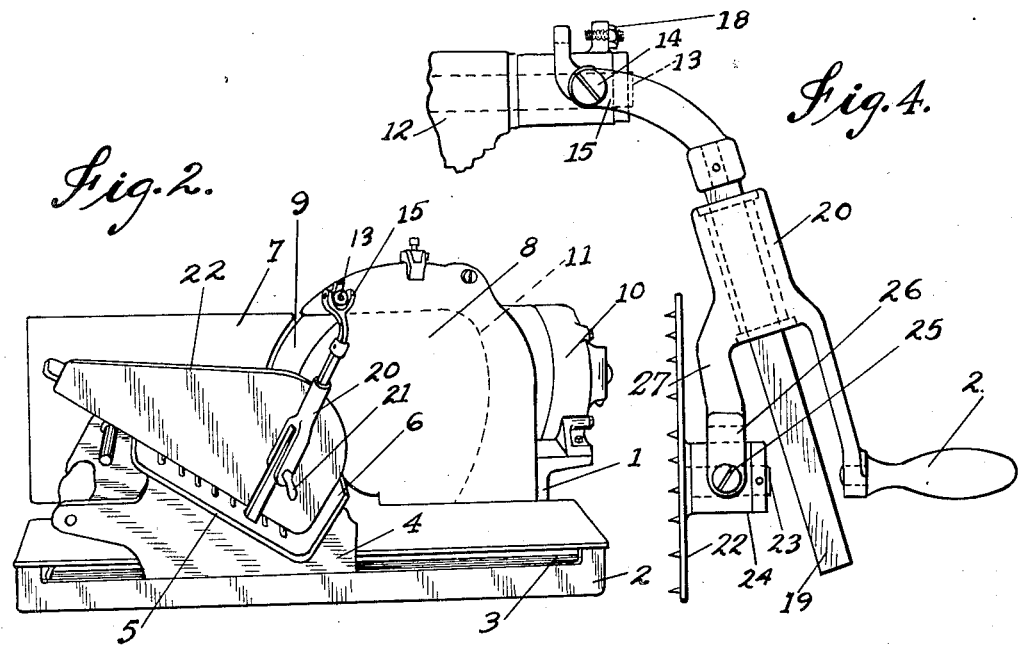
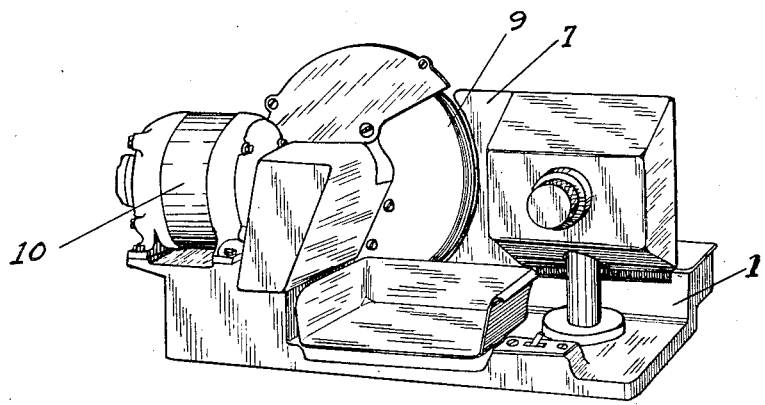
INVENTOR.
Elmer G. Streckfuss
BY
ATTORNEYS Jan. 9, 1934.  E. G. STRECKFUSS  1,942,520
MEAT SLICER
Filed Sept. 13, 1929   3 Sheets-Sheet 3
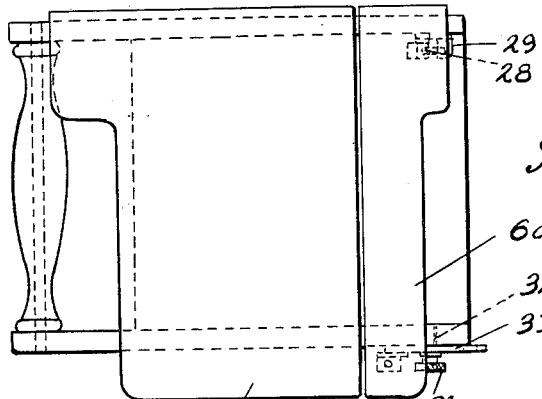
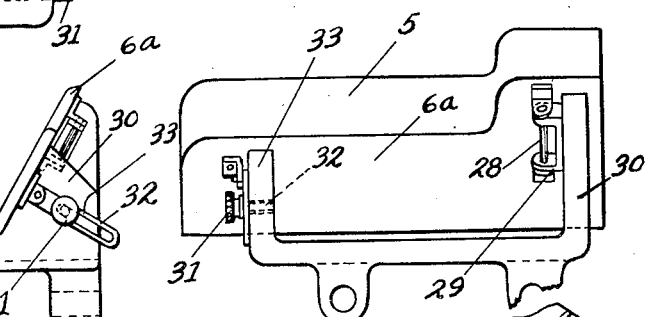
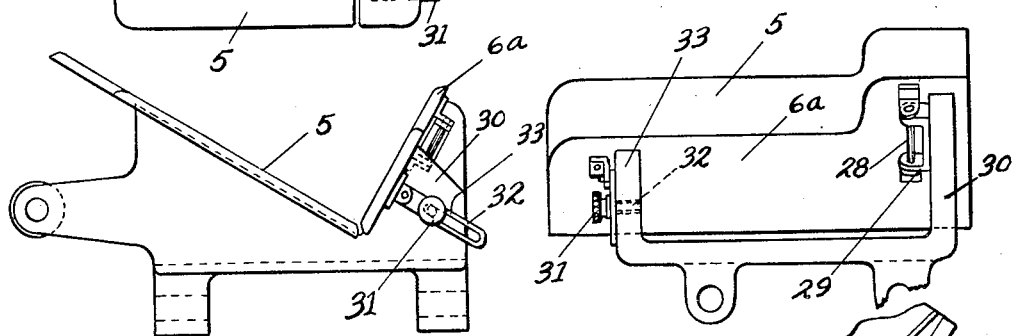
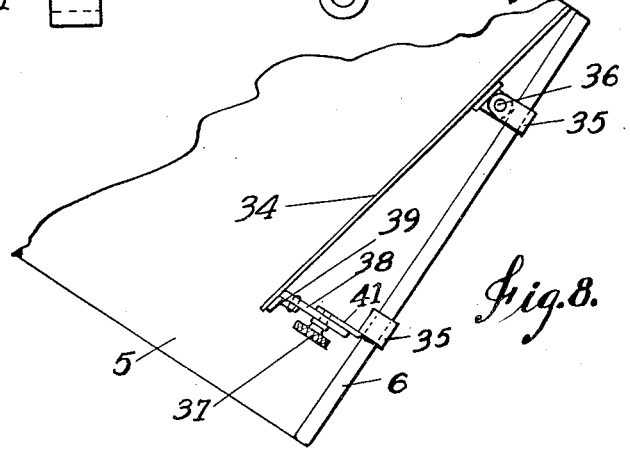
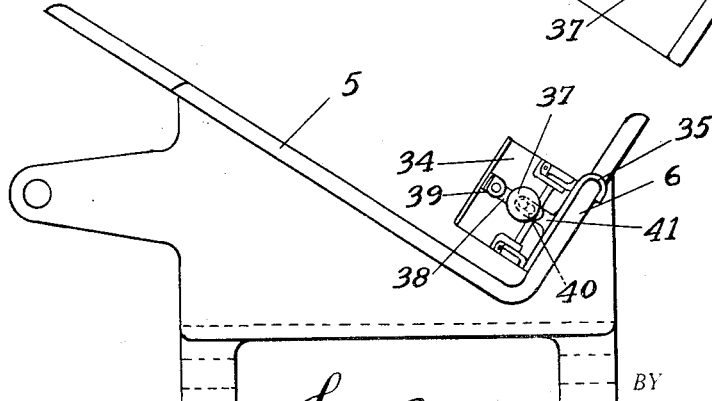
INVENTOR.
Elmer G. Streckfuss
BY
ATTORNEYS Patented Jan. 9, 1934

1,942,520

UNITED STATES PATENT OFFICE 1,942,520

MEAT SLICER

Elmer G. Streckfuss, Cincinnati, Ohio, assignor to The Cincinnati Time Recorder Company, Cincinnati, Ohio, a corporation of Ohio Application September 13, 1929
Serial No. 394,656

15 Claims. (Cl. 146—102)

My invention relates to meat slicers generally, and particularly to the type having a knife rotatable on a fixed axis and a movable meat carriage.

In meat slicers of the type noted, it has been customary in the past to provide the movable meat carriage with a tray for meat, and a pusher plate which is movable across the carriage to advance the meat with each successive slice. This is convenient during the entire cut of the meat, and it further offers a means for cutting the last slices without endangering the operator's fingers. In cutting some types of meat, such as certain kinds of sausage, it is desirable to cut the slices diagonally of the length. If a pusher plate is mounted on the meat carriage or tray, the movement of the meat will be substantially parallel to the plane of the knife or guard plate. To provide a pusher plate which will move the meat at an angle to what would normally be at a right angle to the plane of the knife or guard plate, then becomes a complicated problem.

It is an object of my invention to provide a pusher plate which, instead of being mounted on the carriage or tray, will be mounted directly on the frame of the machine. It is another object of my invention to provide a pusher plate mounting having pivotal movement so that the pusher plate can freely follow the meat irrespective of the movements in other directions of the tray on which the meat is supported and irrespective of whether the meat is advanced at a right angle to or at some other angle to the plane of the knife.

Another object of my invention is to provide an auxiliary device or tray plate which will guide the meat so that transverse diagonal cuts of the meat will be made.

The above and other objects to which reference will be made in the ensuing disclosure, I accomplish by that certain combination and arrangement of parts of which I have shown several preferred modifications illustrative of my invention.

Referring to the drawings:—

Figure 1 is a front elevation of a meat slicer having a pusher plate mounting directly on the machine frame.

Figure 2 is a perspective view of the type of slicer shown in Figure 1.

Figure 3 is a perspective view, from the rear, of the type of slicer shown in Figures 1 and 2.

Figure 4 is a detail side view of the machine frame mounting for the pusher plate shown in Figures 1 and 2.

Figure 5 is a plan view of a meat carriage having one of its sides pivoted relative to the other so that a diagonal slice of meat may be made.

Figure 6 is a front elevation of the meat carriage shown in Figure 5.

Figure 7 is a side elevation of the meat carriage shown in Figures 5 and 6.

Figure 8 is a fragmentary plan view of a modified type of tray in which an auxiliary diagonal slicing guide plate is provided for use with a standard type of tray.

Figure 9 is a front elevation of a carriage such as is shown in Figure 8 in which the auxiliary diagonal slicing guide is provided.

Referring first to Figures 1-4, in which the pusher plate mounting direct on the machine frame is shown, I have shown a slicing machine having a frame 1. The frame has an extension 2 having guide bars 3 which guide the tray carriage 4 across the cutting face of the knife. On the meat carriage is mounted the meat tray having a supporting plate 5, and a side plate 6, the side plate being inclined at a lesser angle to the vertical than the supporting plate.

The machine frame carries the guide plate 7 and the guard plate 8. The knife 9 is mounted in the usual manner with a motor 10 for driving it. In the specific illustration shown the guide plate, knife and guard plate are all substantially parallel, and the meat or tray carriage is movable in a plane parallel to the planes of the guide plate, knife and guard plate. The guard plate may be dished out as indicated at 11 to provide a guard enclosing the knife at the side opposite its cutting edge.

Extending out from the top of the machine frame I have provided a boss 12 from which a post 13 extends out toward the meat tray. A collar 17 is rotatably mounted on the post 13. Pins 14 extend out horizontally from the sides of the collar 17, and a yoke 15 is swiveled on the pins 14. A boss 16 extending up from the collar 17, provides a convenient mounting for an adjustment bolt 18, the end of which limits the swiveling movement of the yoke.

A shaft 19 extends down from the yoke and a sleeve bracket 20 is slidably and rotatably mounted on the shaft. Extending out from the sleeve bracket is a handle 21 by which the pusher plate 22 may be manipulated to push the meat along the carriage. The pusher plate has a mounting stud 23 on which a collar 24 is rotatably mounted, and the collar 24 has pins 25 which provide a pivotal mounting for it in the fork 26 of an arm 27 extending from the sleeve bracket 20.

I have thus provided a mounting, direct on the machine frame, for a pusher plate, and the double pivotal and sliding connections permit the pusher plate to follow the tray and carriage and also permit movement of the pusher plate freely and independently while turned at various angles to the direction of movement of the tray and carriage to push the meat to the knife while at various angles to the cutting plane.

In Figures 5 to 7 I have shown a tray in which the supporting plate 5 has a side supporting plate 6a having at its inner end a pivotal mounting 28 in a pair of bosses 29 extending from an upright arm 30 of the carriage. The outer end of the plate 6a has pivoted to it a link clamped by an adjustment bolt 31 which extends through a slot 32 formed in the link. The bolt 31 screws into an arm 33 also extending up from the carriage.

It will be obvious that when the adjustment bolt 31 is unloosened, the outer end of the side plate 6a may be swiveled and set at a desired angle to the guide and guard plate so that meat may be guided down the tray, as pushed with the pusher plate having a mounting such as is illustrated in Figures 1 to 4, and cut in diagonal slices.

In Figures 8 and 9 I have shown a tray of standard type having an auxiliary diagonal slicing guide plate 34. A pair of channeled members 35 may be engaged with the top edge of the tray side plate 6. At an end a pivotal mounting 36 is provided, and at the other end an adjustment bolt 37 clamps a link 38, pivoted in a boss 39 and extending out from the rear face of the guide 34. The bolt 37 extends through a slot 40 in the link and is screwed into an arm 41 extending out from the member having the channeled portion.

In operating the modified type of device shown in Figures 8 and 9 by unloosening the adjustment bolt 37 the auxiliary plate 34 may be set at a desired angle, and in this instance also a pusher plate, such as that shown in Figures 1 to 4, may be employed for pushing the meat against the cutting face of the knife. In both modified types of diagonally slicing arrangements, the pusher plate mounting permits the pusher plate to be advanced independently of the direction of movement of the carriage and tray.

Having thus described my invention, what I claim as new and desire to secure by Letters Patent, is:—

1. A meat slicer having a circular knife rotatable on a fixed axis, a meat carriage carrying a tray movable substantially in a plane parallel to said knife, and means for guiding meat on said tray so as to cut a diagonal slice from said meat, and a pusher plate having a mounting permitting the movement of said plate freely in cooperation with said meat guiding means, said mounting for said pusher plate being independent of said tray.

2. A meat slicer having a circular knife rotatable on a fixed axis, a meat carriage carrying a tray movable substantially in a plane parallel to said knife, and means for guiding meat on said tray so as to cut a diagonal slice from said meat, and a pusher plate having a mounting permitting the movement of said plate freely in cooperation with said meat guiding means, said mounting for said pusher plate being independent of said tray, and being supported on said machine frame.

3. A meat slicer having a circular knife rotatable on a fixed axis, a meat carriage carrying a tray movable substantially in a plane parallel to said knife, and means for guiding meat on said tray so as to cut a diagonal slice from said meat, said tray having a supporting plate, and said guiding means being adjustable relatively to the supporting plate, and a pusher plate having a mounting permitting the movement of said plate freely in cooperation with said meat guiding means.

4. A meat slicer having a circular knife rotatable on a fixed axis, a meat carriage carrying a tray movable substantially in a plane parallel to said knife, and means for guiding meat on said tray so as to cut a diagonal slice from said meat, said tray having a supporting plate, and said guiding means being adjustable relatively to the supporting plate, and a pusher plate having a mounting permitting the movement of said plate freely in cooperation with said meat guiding means, said mounting for said pusher plate being independent of said tray.

5. A meat slicer having a circular knife rotatable on a fixed axis, a meat carriage carrying a tray movable substantially in a plane parallel to said knife, and means for guiding meat on said tray so as to cut a diagonal slice from said meat, said tray having a supporting plate, and said guiding means being adjustable relatively to the supporting plate, and a pusher plate having a mounting permitting the movement of said plate freely in cooperation with said meat guiding means, said mounting for said pusher plate being independent of said tray, and being supported on said machine frame.

6. In combination with a meat slicer and the frame thereof, a meat tray, a movable carriage for said tray, a pusher for meat on said tray, and a mounting for said pusher having double swiveled connections and slidable connections, said mounting being independent of said tray and movable carriage.

7. In combination with a meat slicer and the frame thereof, a meat tray, a movable carriage for said tray, a pusher for meat on said tray, and a mounting for said pusher having double swiveled connections and slidable connections, said mounting being independent of said tray and movable carriage, and being mounted on the machine frame.

8. In combination with a meat slicer and the frame thereof, a meat tray, a movable carriage for said tray, a pusher for meat on said tray, and a mounting for said pusher having double swiveled connections and slidable connections, said mounting being indepedent of said tray and movable carriage, and adjustable means for limiting the movement of said pusher.

9. In combination with a meat slicer and the frame thereof, a meat tray, a movable carriage for said tray, a pusher for meat on said tray, and a mounting for said pusher having double swiveled connections and slidable connections, said mounting being independent of said tray and movable carriage, and being mounted on the machine frame, and adjustable means for limiting the movement of said pusher.

10. In combination with a meat slicer having a frame and a disc knife rotatable on a fixed axis, means for reciprocating meat past said knife in such position relative to said knife as to cut a transverse slice from said meat and manually controlled pushing means for meat disposed on said guiding means, said pushing means being mounted on said frame.

11. A meat slicer having a knife, a tray movable along the cutting edge of said knife, a support for said knife and said tray, a pusher plate in said tray, and a mounting for said pusher plate on said support on which it is adjustable to an angle to the plane of movement of said tray.

12. A meat slicer having a knife, a tray movable along the cutting edge of said knife, a support for said knife and said tray, a pusher plate in said tray, and a mounting for said pusher plate on said support on which it is adjustable universally to angles to the plane of movement of the tray.

13. In a slicing machine having a knife, a tray movable along the cutting edge of the knife, a support for the knife and the tray, and a pusher plate in the tray, a mounting for said pusher plate comprising swivel means, each comprising pivotal connections on axes at an angle to each other, one swivel means mounted on the support above the path of the tray and the other swivel means mounted on the pusher plate, and means connecting said swivel means allowing variation of distance between said swivel means and allowing turning of said other swivel means as a whole, relative to the one swivel means, on an angle to both axes of each swivel means.

14. In a slicing machine having a knife, a tray movable along the cutting edge of the knife, a support for the knife and the tray, and a pusher plate in the tray, a mounting for said pusher plate comprising swivel means, each comprising pivotal connections on axes at an angle to each other, one swivel means mounted on the support above the path of the tray and the other swivel means mounted on the pusher plate, and elements connected to the respective swivel means and having a slidable and pivotal connection to each other, the sliding of the connection allowing variation in distance between said swivel means and the pivoting of the connection allowing turning of said other swivel means as a whole, relative to the one swivel means, on an angle to both axes of each swivel means.

15. In a slicing machine having a knife, a tray movable along the cutting edge of the knife, a support for the knife and the tray, and a pusher plate in the tray, a handle, a swivel connecting said pusher plate to said handle, having pivots on axes at an angle to each other, a mounting on which said handle is movable up and down and also rotatable on an axis at an angle to both axes of said swivel, and a swivel connecting said mounting to said support above the path of the tray, having pivots on axes at an angle to each other, permitting said mounting to swing with the tray and pusher plate as the tray moves along the cutting edge of the knife and also to swing with the pusher plate in a motion at an angle to the tray movement.

ELMER G. STRECKFUSS.